United States Patent [19]
Fisher

[11] 3,758,077
[45] Sept. 11, 1973

[54] BUMPER LIFT HOOK
[75] Inventor: James Glenn Fisher, Hartwell, Ga.
[73] Assignee: NVF Comapny, Wilmington, Del.
[22] Filed: Feb. 23, 1972
[21] Appl. No.: 228,600

[52] U.S. Cl. .............................................. 254/133
[51] Int. Cl. .............................................. B66f 3/00
[58] Field of Search ............... 254/93 R, 93 H, 99, 254/100, 133, 134, 108–112; 24/230, 5 AD, 5 BH, 73 HH

[56] References Cited
UNITED STATES PATENTS
315,309   4/1885   Massey .............................. 254/112
3,412,980   11/1968   Pikoske .............................. 254/99

Primary Examiner—Othell M. Simpson
Assistant Examiner—Robert C. Watson
Attorney—Luke A. Mattare et al.

[57] ABSTRACT

A bumper lift hook including a bracket means, a plurality of movable bumper engaging hooks carried by said bracket means, at least one of said hooks, after being moved, insertable through a slot in a vehicle bumper, and all of said hooks engageable with the bottom edge of a bumper.

17 Claims, 11 Drawing Figures

PATENTED SEP 11 1973

BUMPER LIFT HOOK

BACKGROUND OF THE INVENTION

This invention relates to bumper jacks, and more particularly, to a unique bumper lift hook for bumper jacks. According to the invention, a plurality of bumper engaging hooks are pivotally connected to a bracket means for attachment to a bumper jack case, with at least one of said hooks pivotally connected with said bracket means for insertion thereof through a slot in a slotted vehicle bumper, and all of said hooks being alignable for engagement with the bottom edge of an unslotted vehicle bumper.

Various efforts have been made in the prior art to devise a bumper jack which can be used with both conventional unslotted vehicle bumpers and with slotted vehicle bumpers. For example, in one such prior art device, a plurality of rigidly interconnected hooks are provided for engagement with the bottom edge of an unslotted bumper, and a separate hook is provided for engagement with the slot in a slotted vehicle bumper. The separate hook is detachable so that it may be removed when the bumper lift hook is used with an unslotted bumper. Accordingly, with this prior art bumper lift hook, the hook must be modified prior to use by either attaching the separate hook thereto or by removing the separate hook, depending on whether the hook is to be used with a slotted bumper or an unslotted bumper. Attachment and/or removal of the separate hook from the bumper lift hook requires considerable time and effort on the part of the user of the bumper lift hook, and when the separate hook is detached from the bumper lift hook, there is considerable likelihood that it will become misplaced or lost.

The bumper lift hook of the present invention is equally as easily used with both slotted and unslotted vehicle bumpers without requiring the addition to or removal from the lift hook of any separate structure, or of otherwise modifying the lift hook before it is used.

The invention comprises a plurality of aligned hooks pivotally connected to a bracket means for attachment to a conventional bumper jack and wherein at least one of the hooks may be pivoted out of alignment with the other hooks for engagement with a slot in a slotted bumper, and wherein all of the hooks may be aligned for engagement with the bottom edge of an unslotted bumper. The bumper lift hook of the present invention does not require any attachment or removal of separate hook means before the lift hook can be used with different design bumpers or the like and there is no danger of any parts of the invention becoming misplaced or lost. The bumper lift hook of the present invention is sturdy, economical and easy to use.

OBJECTS OF THE INVENTION

It is an object of this invention to provide a bumper lift hook which can be used equally as well with both slotted vehicle bumpers and with unslotted vehicle bumpers.

Another object of this invention is to provide a bumper lift hook wherein a plurality of bumper engaging hooks are mounted for pivotal movement relative to one another so that at least one of said hooks may be inserted through a slot in a slotted bumper and the other hooks pivoted out of the way, or all of said hooks may be aligned and engaged with the bottom edge of a bumper.

DETAILED DESCRIPTION OF THE INVENTION

Figure 1:
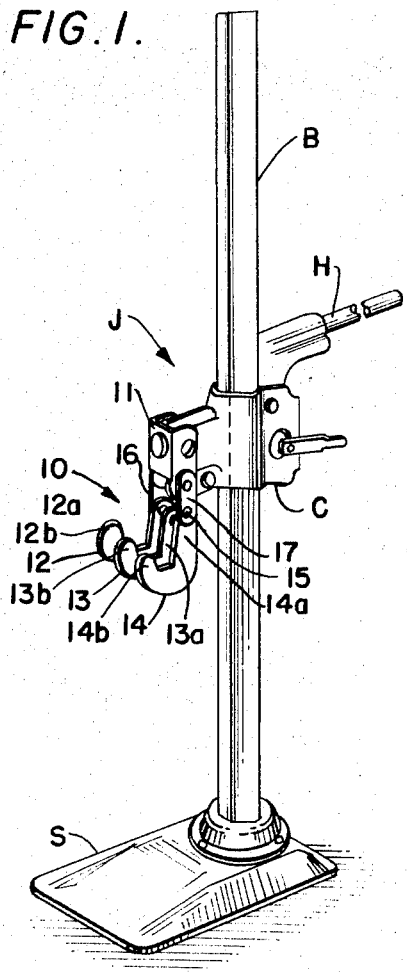
FIG. 1 is a perspective view of a bumper jack having the bumper lift hook of the invention thereon with the bumper engaging hooks in alignment.

Referring particularly to the drawings, wherein like reference numerals indicate like parts throughout the several views, a conventional vehicle bumper jack, such as shown in U.S. Pat. No. 2,743,903, is indicated generally at J in FIG. 1, and comprises an elongate, upright ratchet bar B of conventional design and having teeth t thereon. The ratchet bar B is supported in vertical position in a conventional, enlarged base S, and a conventional bumper jack case C is mounted on the bar B for vertical movement therealong in a conventional and well-known manner. A handle H is operatively connected with the case C for actuating the case vertically along the bar B.

A unique bumper lift hook 10 is detachably connected to the bumper jack case C for vertical movement therewith and comprises a channel-shaped bracket means 11 having a plurality of substantially identical hooks 12, 13 and 14, including shank portions 12a, 13a and 14a, respectively, and hook portions 12b, 13b and 14b, respectively. The hooks 12, 13 and 14 are pivotally connected at the upper ends of the shank portions thereof to a pivot pin 15 connected at its opposite ends to the lower ends of a pair of spaced, depending links 16 and 17. The links are pivotally connected at their upper ends to the channel-shaped bracket means 11, which is detachably connected to the bumper jack case C.

Figure 2:
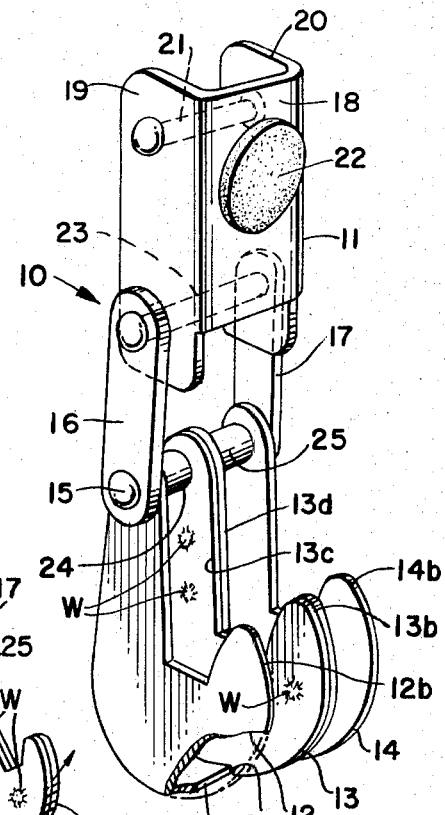
FIG. 2 is an enlarged perspective view, with a portion thereof broken away, of the bumper lift hook of the present invention removed from the bumper jack, and with all of the hooks in aligned position.
Figure 4:
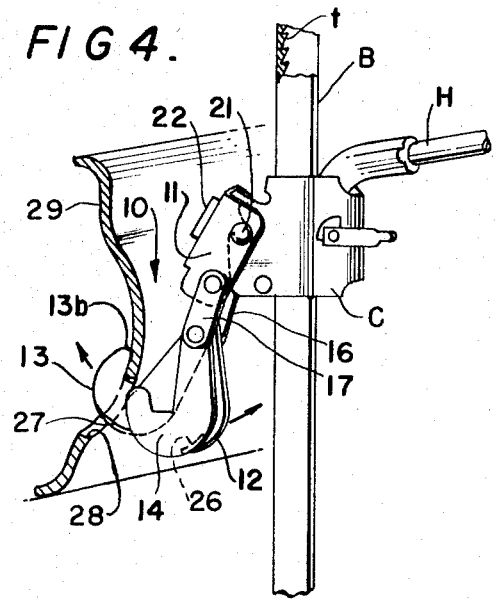
FIG. 4 is a partial perspective view, with portions broken away, showing the bumper lift hook of the present invention engaged in a slotted bumper.

In FIG. 2, the bumper lift hook 10 is shown detached from the case C, with the bumper engaging hooks 12, 13 and 14 aligned with one another for engaging the bottom edge of a bumper as shown, for example, in FIG. 4. The bracket 11 is of one-piece steel construction and includes a front wall 18 and spaced apart, parallel, rearwardly extending side walls 19 and 20.

A pin or rod 21 is connected at its opposite ends to the side walls 19 and 20 adjacent the upper ends thereof for connecting the bracket 11 to the case C in a conventional and well-known manner.

A suitable, resilient button or grommet 22 is affixed to the front wall 18 for engaging the face of a bumper when in use to protect the finish of the bumper.

A pivot pin or rod 23 is connected to and extends between the side walls 19 and 20 adjacent the lower ends thereof and projects at its opposite ends outwardly beyond the walls 19 and 20. The links 16 and 17 are pivotally connected at their upper ends to the outwardly projecting ends of the pin 23 on the outside of the walls 19 and 20.

Figure 3:
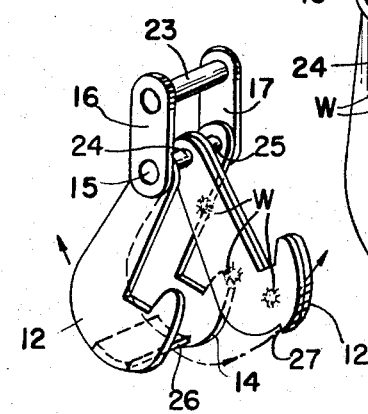
FIG. 3 is a perspective view of the bumper lift hook of the present invention with the hooks pivotally moved away from one another in a position for the center hook to be inserted through a slot in a bumper.

As seen best in FIGS. 2 and 3, hooks 12 and 14 are pivotally connected to the pin 15 adjacent the links 16 and 17, respectively, and hook 13 is pivotally connected to the pin 15 in the middle thereof. Spacer sleeves 24 and 25 are positioned about the pin 15 between the hooks 12, 13 and 14 for holding the hooks in spaced relationship to one another.

The hook 13 is of double thickness and comprises a pair of hooks 13c and 13d suitably secured together in flat abutting relationship as by means of spot welds W or the like. The double thickness of hook 13 renders it sufficiently strong to support a vehicle when inserted through the slot of a bumper and with the other hooks 12 and 14 moved to inoperative position.

In FIG. 3, the center hook 13 is shown pivoted forwardly out of alignment with the remaining or side hooks 12 and 14 in a position for the center hook 13 to be inserted through a slot 28 in a bumper 29 as seen in FIG. 4.

Figure 5:
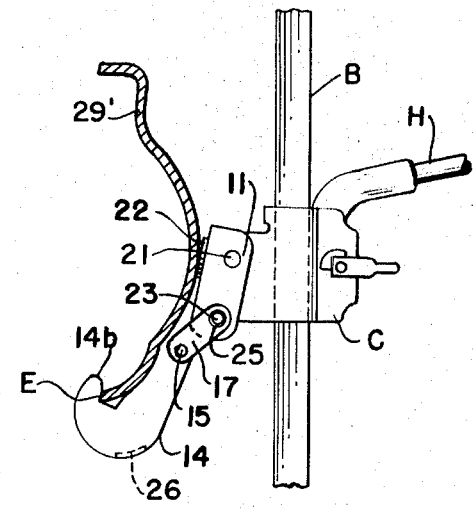
FIG. 5 is a partial view in elevation of the bumper lift hook of the present invention engaged with the bottom edge of a bumper.
Figure 6:
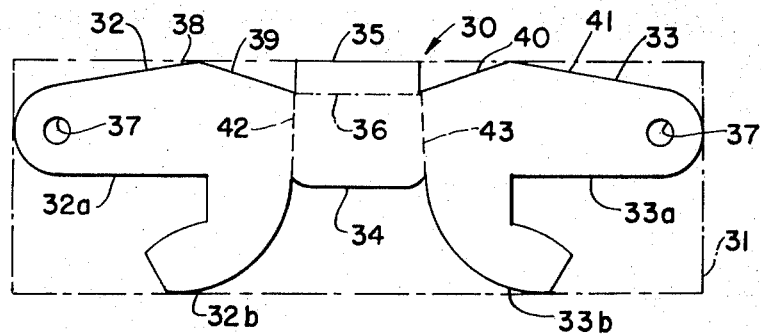
FIG. 6 is a plan view of a one-piece stamping for making a modified bumper lift hook.

A stop plate 26 extends between and is connected at its opposite ends as by welding or the like to the bottom arcuate edge portions of hooks 12 and 14, and the hook 13 has a shoulder 27 in its bottom arcuate edge for engaging the stop plate 26 when in the position shown in FIGS. 2 and 5 to maintain the hooks 12, 13 and 14 in alignment so that all of the hooks exert a substantially equal lifting force on the bottom edge of a bumper when in engagement therewith.

In FIG. 5, all three of the hooks 12, 13 and 14 are engaged with the bottom edge E of a bumper 29', and when the bumper lift hook 10 is used as shown in FIG. 5, engagement of the shoulder 27 with stop plate 26 results in alignment of the three hooks 12, 13 and 14, and the hooks thereby exert an equal lifting force on the bottom edge of the bumper when the jack case C is raised along the ratchet bar B upon actuation of the handle H in a conventional and well-known manner.

In a preferred embodiment, the ratchet bar B is preferably made of solid steel and has a V-shaped cross-sectional configuration with the teeth t rolled in at the mill. The case C is also of steel construction for strength and durability and is of conventional design. The bracket 11, links 16 and 17 and hooks 12, 13 and 14 are also all preferably made of steel, and the grommet or button 22 is preferably made of a rubber material.

The configuration of the hooks 12, 13 and 14, including the upturned ends 12b, 13b and 14b thereof, results in the hooks engaging a bumper with a vice like grip and prevents accidental dislodgement of the hooks from the bumper during use.

The bumper lift hook 10 may be used with other type jacks, such as tripod jacks and the like, if desired; and rather than the rigid links 16 and 17, a chain construction such as shown in U.S. Pat. No. 3,180,618, for example, may be used with the present invention, if desired.

A modified bumper lift hook is illustrated in FIGS. 6 through 11 and comprises a one-piece stamping 30 stamped from a sheet 31 of material, and having integral, opposite side bumper engaging hooks 32 and 33 and a bottom web or plate 34 extending between and integral with the bottoms of hooks 32 and 33. A short, rearwardly extending tab 35 is integral with the bottom 34 along the rearward edge thereof at a fold line 36 and is of substantially the same width as the bottom 34. Each of the hooks 32 and 33 includes a shank portion 32a, 33a, respectively, and a hook portion 32b, 33b, respectively. An opening 37 is formed in each shank portion adjacent the upper end thereof. The back sides of the hooks 32 and 33 are comprised of two substantially straight portions or edges 38, 39 and 40, 41, respectively, and substantially straight fold lines 42 and 43 are defined between the bottom 34 and hooks 32 and 33, respectively.

Figure 8:
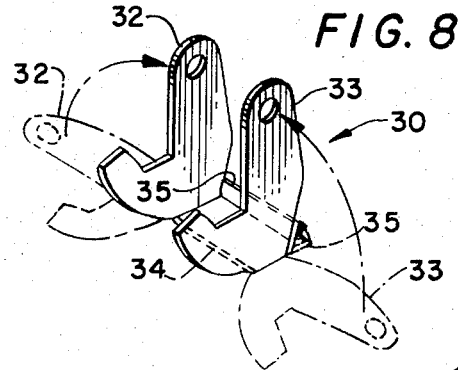
FIG. 8 is a perspective view of the stamping of FIG. 6 with the hook portions folded upwardly to form a bumper lift hook.

In FIG. 8, the side hook portions 32 and 33 are bent upwardly about fold lines 42 and 43 into substantially perpendicular relationship to bottom 34, and tab 35 is folded upwardly about fold line 36 into substantially flush, parallel relationship with edges 39 and 40 of hooks 32 and 33, respectively, to form a stop. As can be seen in this Figure and in FIG. 11, the bottom 34 is spaced slightly downwardly from the plane of the bottom edges of hooks 32 and 33.

Figure 7:
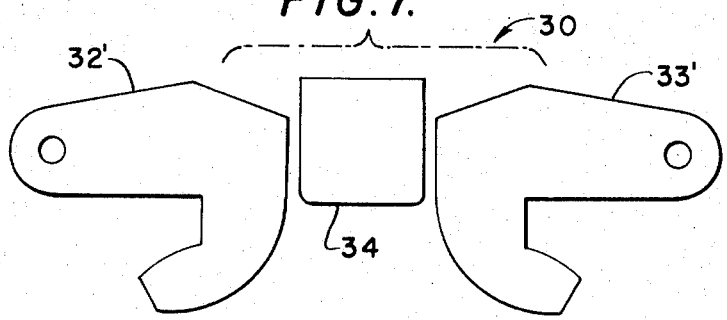
FIG. 7 is an exploded view of a stamping as in FIG. 1, with the hook portions severed from the connecting bottom portion.
Figure 9:
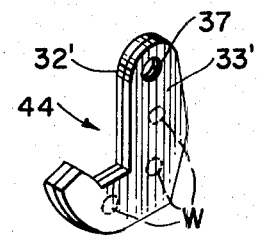
FIG. 9 is a perspective view of a bumper lift hook comprised of the two hook portions of FIG. 7 welded or otherwise suitably secured together.

In FIG. 9, the severed or separated side hook portions 32' and 33' of FIG. 7 are welded or otherwise secured together in side-by-side relationship to form a double thickness center hook 44. The side hook portions 32' and 33' are formed by separating the bottom 34 from the stamping 30 along fold lines 42 and 43.

Figure 10:
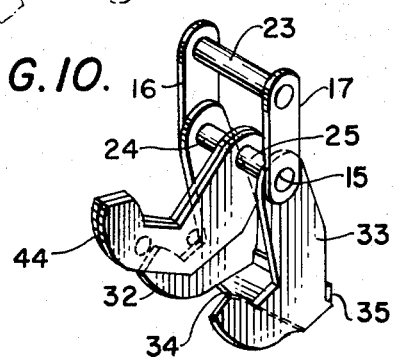
FIG. 10 is a perspective view of a modified bumper lift hook utilizing the one-piece stamping of FIG. 8 and the double hook of FIG. 9.
Figure 11:
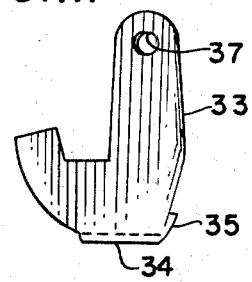
FIG. 11 is a side view in elevation of the hook of FIG. 8.

In FIG. 10, the one-piece stamping 30, including side hooks 32 and 33, bottom 34, and stop or tab 35, is assembled with center hook 44 on a bracket means 10 as in the embodiment of FIG. 2. The modified bumper lift hook is used in the same manner as the embodiment of FIG. 2, except that the center hook swings rearwardly over bottom 34 into contact with stop 35 to maintain the hooks aligned for use together under the edge of a bumper.

The form of the invention illustrated in FIGS. 6 through 11 is easier and more economical to manufacture than other bumper lift hooks, and the straight cut edges of various portions of the hooks result in a savings of material over other bumper lift hooks, while at the same time providing additional material at the lifting points of the hooks and thus resulting in a strong hook as well as an economical hook.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A bumper lift hook for attachment to a bumper jack for interchangeable use with a slotted vehicle bumper and an unslotted vehicle bumper, said bumper lift hook comprising a plurality of substantially similar, flat, connected together, spaced apart, aligned hooks, said hooks having a flat shank and an integral flat hook portion, said flat hook portions all being in alignment with one another, a bracket means, means connecting said flat hooks to a common shaft on said bracket means, means on said bracket means for readily removably attaching said bracket means and flat hooks as a unit to a bumper jack or the like, at least one of said flat hooks pivotally connected to said bracket means for pivotal movement thereof out of alignment with the other of said flat hooks, said one flat hook constructed for insertion thereof through a narrow, preformed, vertically extending slot in a vehic'e bumper for lifting a vehicle when said bracket means and flat hooks are attached to a bumper jack or the like, and all of said flat hooks, when in alignment, simultaneously engageable with a bottom edge portion of a vehicle bumper to lift a vehicle when said bracket means and flat hooks are attached to a bumper jack or the like.

2. A bumper lift hook as in claim 1, wherein spacer means are on said shaft between adjacent hooks to space said hooks from one another along said shaft.

3. A bumper lift hook as in claim 2, wherein there are three hooks, including a pair of spaced apart side hooks and a center hook between the side hooks.

4. A bumper lift hook as in claim 3, wherein there is stop means on said hooks to maintain said hooks in alignment with one another.

5. A bumper lift hook as in claim 4. wherein said stop means comprises a plate connected at its opposite ends to said side hooks and extending therebetween, and said center hook having shoulder means engaged with said plate when said hooks are aligned.

6. A bumper lift hook as in claim 5, wherein said shaft on which said hooks are pivotally mounted is connected at its opposite ends to the lower ends of a pair of spaced links, said links pivotally connected at their upper ends to said bracket means.

7. A bumper lift hook as in claim 6, wherein said hooks comprise thin, stamped sheet material.

8. A bumper lift hook as in claim 7, wherein said center hook is twice as thick as the side hooks and comprises a pair of hooks welded together in flat abutting engagement.

9. A bumper lift hook as in claim 8, wherein said bracket means is channel shaped, and said links are pivotally connected thereto on opposite sides thereof at the lower end of said bracket means.

10. A bumper lift hook as in claim 9, wherein a pin is connected to said bracket means at the upper end thereof for attachment of said bracket means to a bumper jack.

11. A bumper lift hook as in claim 10, wherein a resilient grommet is on the front of said bracket means for engaging a bumper when the bumper lift hook is in use to protect the finish of said bumper.

12. A bumper lift hook as in claim 11, wherein said bumper lift hook is made of steel.

13. A bumper lift hook as in claim 5, wherein said plate is welded at its opposite ends to the bottoms of said side hooks, said shoulder means on said center hook arranged to engage the front edge of said plate to maintain said hooks in alignment.

14. A bumper lift hook as in claim 13, wherein said center hook is of double thickness and comprises a pair of hooks welded together in flat abutting engagement.

15. A bumper lift hook as in claim 5, wherein said plate and said side hooks comprise a one-piece stamping.

16. A bumper lift hook as in claim 15, wherein said stop means comprises an integral, upturned tab or stop along the back edge of said plate, and said shoulder means comprises the bottom, back edge portion of said center hook.

17. A bumper lift hook as in claim 16, wherein said center hook comprises a pair of side hook portions separated from said one-piece stamping and welded together in flat abutting contact to form a center hook of double thickness.

* * * * *